United States Patent [19]
Lin

[11] Patent Number: 6,161,299
[45] Date of Patent: Dec. 19, 2000

[54] RAPID BRAKE DEVICE FOR A TAP RULE

[75] Inventor: Henry Lin, Taipei, Taiwan

[73] Assignee: Index Measuring Tape Co., Ltd., Taipei, Taiwan

[21] Appl. No.: 09/188,336

[22] Filed: Nov. 9, 1998

[51] Int. Cl.[7] .................................................. G01B 3/10
[52] U.S. Cl. ................................................................ 33/767
[58] Field of Search ................................................ 33/767

[56] References Cited

U.S. PATENT DOCUMENTS

| | | | |
|---|---|---|---|
| 5,395,069 | 3/1995 | Chen | 33/767 |
| 5,531,395 | 7/1996 | Hsu | 33/767 |
| 5,575,077 | 11/1996 | Jung et al. | 33/767 |
| 5,657,551 | 8/1997 | Lin | 33/767 |
| 5,791,581 | 8/1998 | Loeffler Tae | 33/767 |

FOREIGN PATENT DOCUMENTS

| | | | |
|---|---|---|---|
| 2108930 | 5/1983 | United Kingdom | 33/767 |

*Primary Examiner*—G. Bradley Bennett
*Attorney, Agent, or Firm*—Dougherty & Troxell

[57] ABSTRACT

A plate shaped rapid brake device for a tape rule accommodated in the tape housing with a brake block protruding towards an upper edge of a tape outlet, at one end, with a pivot axis laid transversely at the other end. A projected block protruded in an opposite direction to the brake block, is formed near the brake block. The pivot axis is inserted into holes in inner walls of both sides of the tape housing, and both the projected block and the brake block are respectively exposed out of a hole provided at the bottom portion of the tape housing so that the tape may slightly touch the projected block during its extending and rewinding motion. Moving the brake block towards the upper edge of the tape outlet and reducing size of the tape outlet rapidly clamps the moving tape and stops its movement. There are two balancers extending outwardly from opposite sides of the brake block for a balancing brake function of the brake device when the brake block moves by preventing the brake device from swinging. Moreover, the brake block can further buffer vibration of the tape arising from its rapid rewinding.

1 Claim, 2 Drawing Sheets

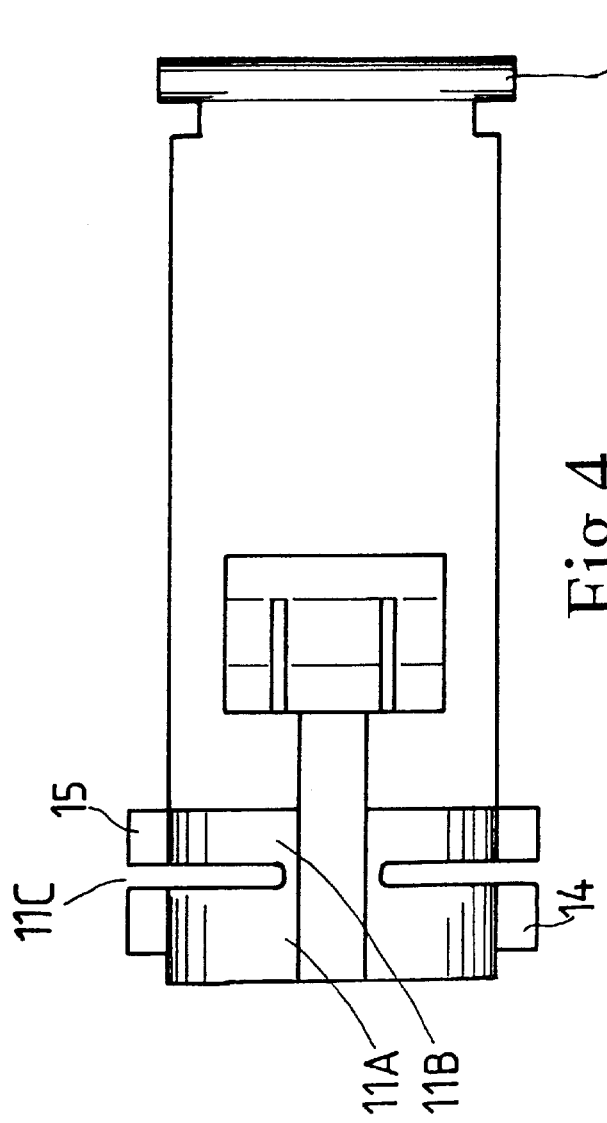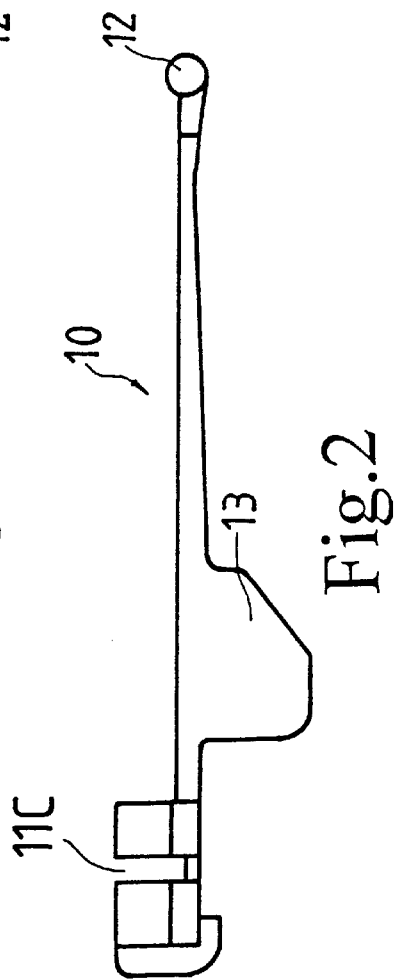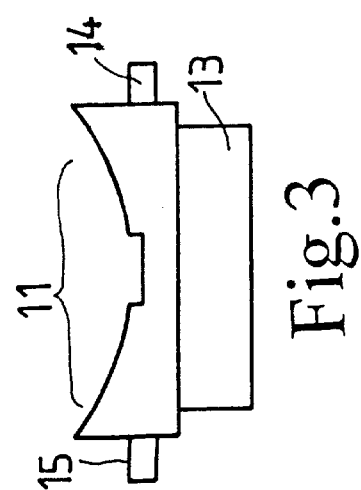

RAPID BRAKE DEVICE FOR A TAP RULE

BACKGROUND OF THE INVENTION

1. Field of the Invention

The present invention relates to a rapid brake device for a tape rule, and more in detail, to a block shaped structure provided in the inner portion of a tape outlet for rapidly stopping the motion of a tape by slightly touching the structure. Moreover, the rapid brake device is not only able to prevent its own unbalancing motion, but is also able to minimize vibration of a tape rule during rewinding.

2. Description of the Prior Art

Measuring devices such as a straight rule or a tape rule have been used to determine length or distance for a long time. The measured length or distance of an object helps us in many respects, such as outdoor building and roadway constructions, carpentry, interior design and decorations etc.

Among all measuring devices for length and distance, the tape rule is the most convenient one. It has a soft flexible measuring tape accommodated in a housing, and the tape may be conveniently drawn out for measurement and rewound back to the housing after completion of the work. A brake device for the tape rule presently in use has a press key provided above the outlet of the tape. Movement of the tape is stopped by pressing the press key. Although such a brake device for a tape rule usually has quite a good effect, yet pressing the press key to stop the movement of the tape by an operator's finger is tiresome, and such a brake device is not able to achieve the object of rapid and time saving operation of a tape rule.

In order to rectify the disadvantages of the conventional tape rule mentioned above, the inventor of the present invention has succeeded in developing an innovated rapid brake device for a tape rule through a long time efforts, it will be disclosed as follows.

SUMMARY OF THE INVENTION

It is a first object of the present invention to provide a rapid brake device for a tape rule which can rapidly clamp the tape and efficiently stop its movement.

It is a second object of the present invention to provide a rapid brake device for a tape rule which can perform a perfect balanced braking function without swinging.

It is a third object of the present invention to provide a rapid brake device for a tape rule which can further contribute to buffer the vibration of the tape during its rapid rewinding.

To achieve these and other objects, the gist of the present invention is to provide in the tape housing a plate shaped brake device with a brake block protruded towards an upper edge of a tape outlet, formed at one end, while a pivot axis is laid transversely at the other end. A projected block protruded in an opposite direction to the brake block, is formed near the brake block. When installing the brake device, the pivot axis is inserted into inner walls of holes bored at both sides of housing at the other side of the tape outlet, and both the projected block and the brake block are respectively exposed out of a through hole provided at the bottom of the housing, and out of another bottom portion of the housing so that the tape may slightly touch the projected block during its extending and rewinding motion thereby removing the brake block towards the upper edge of the tape outlet and reducing the size of the tape outlet to rapidly clamp the moving tape and stop its movement.

Furthermore, there are two balancers respectively stretched outwardly from right and left sides of the brake block used for performing a balanced braking function of the brake device when the brake block removes and preventing swing of the brake device. Moreover, the brake block can further contribute to buffer vibration of the tape arising from its rapid rewinding.

BRIEF DESCRIPTION OF THE DRAWINGS

The above objects and advantages of the present invention will become more apparent by describing in detail a preferred embodiment thereof with reference to the attached drawings in which:

FIG. 2 is a side view drawing of the rapid brake device for a tape rule according to the present invention;

FIG. 3 is a front view drawing of the rapid brake device for a tape rule according to the present invention;

FIG. 4 is a top view drawing of the rapid brake device for a tape rule according to the present invention.

DETAILED DESCRIPTION OF THE PREFERRED EMBODIMENT

Figure 1:
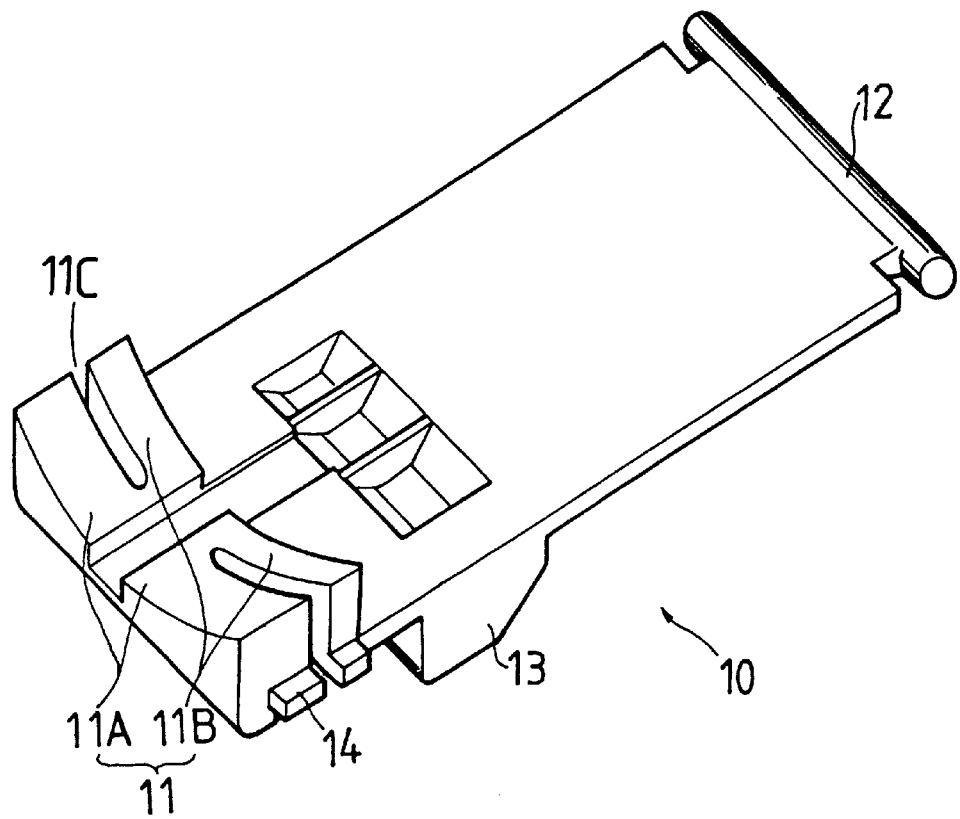
FIG. 1 is a three dimensional drawing showing the structure of the rapid brake device for a tape rule according to the present invention.

Referring to FIG. 1, a three dimensional drawing showing the structure of the rapid brake device for a tape rule according to the present invention, and also to FIG. 2 through FIG. 4, which respectively show a side view, a front view, and a top view of the rapid brake device for a tape rule according to the present invention, it will be observed that there is a plate shaped brake device 10 with a protruded brake block 11 formed in one end, and a pivot axis 12 laid transversely at the other end. A projected block 13 protrudes in an opposite direction to the brake block 11, and is formed near the brake block 11. Furthermore, there are two balancers 14, 15 respectively extending outwardly from right and left sides of the brake block 11. The brake block 11 further includes a plurality of saddle pieces 11A, 11B disposed along both sides of the brake block 11, and a separating slot 11C is formed between saddle pieces 11A and 11B.

Figure 5:
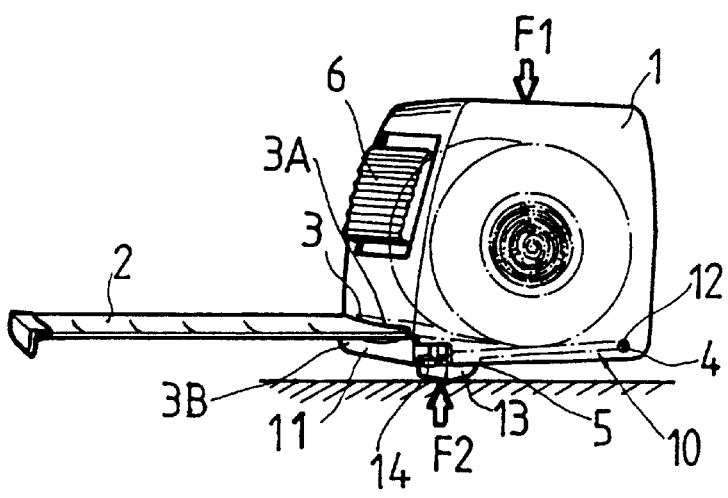
FIG. 5 is a drawing showing the rapid brake device for a tape rule in an embodiment according to the present invention.

FIG. 5 illustrates an embodiment of the present invention in which the rapid brake device 10 is installed in the tape housing 1 with its brake block 11 placed at one end behind the inner wall of the tape outlet 3, while the pivot axis 12 at the other end being inserted into holes in inner walls 4 of holes provided at both sides of housing 1. Both the projected block 13 and the brake block 11 are respectively exposed out of a through hole 5 provided at the bottom of the housing 1, and out of another bottom portion of the housing 1 such that the brake block 11 is sandwiched between upper and lower wall edges 3A, 3B of the tape outlet 3. The balancers 14 and 15 extending out of two bottom sides of the housing 1, serve us as a balancing mechanism to damp vibration of the rapid brake device 10 during its operation.

When it is desired to stop movement of the tape 2, either during extending or during rewinding, a downwards force $F_1$ is applied on a top surface of the tape housing 1 so as to introduce a reactional upward force $F_2$ by slightly touching the projected block 13 against the ground. At this moment, by lever principle, the projected block 13, in respect to the pivot axis 12 as a center, is raised towards the upper wall edge 3A of the tape outlet 3 resulting in reducing size of the tape outlet 3 and stopping movement the tape 2 by clamping thereof and accomplishing a rapid brake function of a tape rule. The rapid brake device 10, together with a press key 6 provided for the tape rule above its tape outlet 3, may contribute to a rapid braking function for the tape movement in addition to a normal stopping function for the tape movement a conventional press key 6 can serve.

A separating slot 11C formed between the saddle pieces 11A, 11B may serve to buffer the impact to the brake block 11 caused by sudden rewinding of the tape 2 so that the brake block 11 has both buffering and vibration resistant effects.

The invention may be embodied in other specific forms without departing from the spirit of essential characteristics thereof. The present embodiment is therefore to be considered in all respects as illustrative and restrictive, the scope of the invention being indicated by the appending claims rather than by the foregoing description, and all changes which come within the meaning and range of equivalency of the claims are therefore intended to be embraced therein.

What is claimed is:

1. A rapid brake device for a tape rule having a tape housing, a wound measuring tape located within the housing and having a tape end extending outwardly of the housing such that the tape is extendable from and retractable into the housing, the brake device comprising:

a) a tape outlet formed in a wall of the housing, with a wall edge forming an upper boundary of the tape outlet;

b) a brake plate having a pivot axle formed on a first end, the pivot axle pivotally engaging openings in the housing so as to pivotally connect the brake plate to the housing, a projected block extending from one side of the brake plate, a brake block extending from an opposite side of the brake plate as the projected block, the brake block having a plurality of saddle pieces separated by a slot, the brake block being located at a second end of the brake plate adjacent to the tape outlet, the projected block and a portion of the brake block extending outwardly of the housing, whereby pressing the projecting block causes pivoting of the brake plate from a release position, wherein movement of the tape is enabled, and a brake position wherein the tape is clamped between the wall edge of the tape opening and the brake block; and, c) a plurality of balancers extending outwardly from opposite sides of the brake block to damp vibration during operation of the brake device.

* * * * *